United States Patent
Muszynski

(10) Patent No.: US 6,731,032 B1
(45) Date of Patent: May 4, 2004

(54) ELECTRIC MOTOR WITH MAGNETIC SENSOR WHEEL

(75) Inventor: Jerzy Muszynski, Rochester Hills, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/267,185

(22) Filed: Oct. 9, 2002

(51) Int. Cl.⁷ ............................................... H02K 11/00
(52) U.S. Cl. .................. 310/68 B; 310/156.06
(58) Field of Search .................. 310/68 B, 156.06, 310/156.08, 156.12, 156.13, 156.14, 156.15, 156.59

(56) References Cited

U.S. PATENT DOCUMENTS

| | | | |
|---|---|---|---|
| 2,775,755 A | 12/1956 | Sink | 340/359 |
| 3,711,724 A | 1/1973 | Uemura | 307/43 |
| 3,959,705 A * | 5/1976 | Salihi | 318/439 |
| 4,064,504 A | 12/1977 | Lepetit et al. | 340/347 |
| 4,086,519 A | 4/1978 | Persson | 318/254 |
| 4,533,902 A | 8/1985 | Baker et al. | 340/347 |
| 4,567,462 A | 1/1986 | Leiby | 340/347 |
| 4,630,033 A | 12/1986 | Baker | 340/347 |
| 4,660,021 A | 4/1987 | Leiby | 340/347 |
| 4,691,192 A | 9/1987 | Baker | 340/347 |
| 4,820,948 A * | 4/1989 | Rogelein | 310/90 |
| 5,079,468 A * | 1/1992 | Sata | 310/168 |
| 5,089,735 A * | 2/1992 | Sawaguchi et al. | 310/88 |
| 5,444,368 A | 8/1995 | Horber | 324/207.16 |
| 5,565,721 A * | 10/1996 | Knappe | 310/68 B |
| 5,614,775 A | 3/1997 | Horski et al. | 310/68 |
| 5,672,923 A * | 9/1997 | Jacobsen et al. | 310/82 |
| 5,675,197 A * | 10/1997 | Jacobsen et al. | 310/82 |
| 5,825,307 A | 10/1998 | Titus et al. | 341/13 |
| 6,175,109 B1 | 1/2001 | Setbacken et al. | 250/231 |

* cited by examiner

Primary Examiner—Thanh Lam
(74) Attorney, Agent, or Firm—Dykema Gossett PLLC

(57) ABSTRACT

A magnetic position sensor wheel for an angular position transducer of an electric motor is provided which includes a hub with a flange, a first ring of magnetic material disposed on one side of the flange between a hub axis and an outer periphery of the flange, and a second ring of magnetic material extending axially along the outer periphery of the flange.

21 Claims, 1 Drawing Sheet

ELECTRIC MOTOR WITH MAGNETIC SENSOR WHEEL

BACKGROUND OF THE INVENTION

1. Field of the Invention

The present invention relates to a magnetic sensor wheel and in particular to a sensor wheel using a rotor position transducer for an AC or DC brushless motor.

2. Discussion of Related Art

Most early electric motors had a rotor rotatively mounted within a housing, often referred to as a stator. The rotor typically included windings which were energized or commutated by an electrical charge. The electrical charge was delivered to the coils of the rotor via a slip ring brush arrangement. The brushes were typically made from an electrically conductive carbon material which slid along an outer diameter of the rotor shaft, commonly referred to as the slip ring. The stator had permanent magnets which completed the electromagnetic field which powered the motor.

Although the slip ring arrangement of commutation is satisfactory, and is still in common use today, the slip ring brush arrangement of commutation requires that a motor periodically undergo maintenance for replacement of the brushes or repair of the slip ring. It is desirable to provide electric motors in which the brush can be eliminated. Such motors are referred to as brushless motors.

In the brushless motor, the permanent magnets of the motor are established on the rotor. The stator has poles with windings. The polarity of the pole windings is controlled by a controller which controls not only the direction of the current, but also the wave form of the current. The controller (sometimes called the driver) must be cognizant of the rotor position to properly control the current to the various windings of the stator. Two position sensing rings are required. The first position sensing ring is a coarse ring which is necessary primarily from motor start up until the motor reaches operational rotational speed.

In high performance applications, it is often desirable that the controls of the coils go beyond normal on/off control (sometimes referred to as trapezoidal control), but that the controller controls the current to the various stator coils in a sinusoidal manner. Thus, after the motor has started, there is an additional need for a fine resolution of rotor angular position. Thus, many brushless motors additionally have a fine resolution rotor shaft angular position sensors. To provide the positional data, many brushless motors are provided with a sensor wheel having two generally concentric position data indicating rings. The higher resolution position data indicator ring is typically outboard of the lower resolution or coarse position data indicator ring.

Often to achieve the resolution desired, the higher resolution ring required an outer diameter that was larger than desired, therefore requiring an enlargement of the motor casing. The enlargement of the high resolution data ring was worsened by the fact that when the sensors were Hall effect sensors there occurred magnetic cross-talk between the two data rings. To minimize the effect of cross-talk, typically a minimum spacing between the data rings was mandated.

There is an option to eliminate the magnetic cross-talk by the utilization of optical sensors. However, in most instances, optical sensing provides a cost penalty as compared with Hall effect sensors. Additionally, optical sensors are not as desirable if the motor is to be utilized in the harsh, dirty or dusty environment.

It is desirable to provide a sensor ring which provides better separation of the magnetic fields for the lower resolution data ring and the high resolution data ring by minimizing magnetic cross-talk.

It is also desirable to provide such a sensor ring wherein the costs are minimized.

SUMMARY OF THE INVENTION

To make manifest the above-noted desires a revelation of the present invention is brought forth.

In a preferred embodiment, the present invention brings forth a brushless motor having a multi poled rotor. Encircling the rotor is a coiled stator. A controller is provided to commutate the coils of the stator. The motor additionally has an angular position transducer to signal the controller of said rotor's angular position. The transducer includes a magnetic position sensor wheel. The sensor wheel has a body defining a hub disposed about an axis of rotation of the rotor. The body also has a flange extending radially from the hub.

A first ring of magnetic material is disposed on one side of the flange between the rotor axis and a radially outer periphery of the flange. A second ring of magnetic material extends axially along a radially outer periphery of the flange. A first resolution sensor generates a first position indicative signal responsive of rotation of the first ring of magnetic material This first signal is utilized during motor start up. A second sensor generates a second high resolution position indicative signal responsive of rotation of the second ring of magnetic material. The second signal is utilized in controlling the wave form of the current which energizes the coils of the stator.

It is an advantage of the present invention to provide a sensor wheel which minimizes cross-talk between two magnetic wheels on a sensor ring.

Other advantages of the present invention will be made apparent to those skilled in the art as the invention is further explained in the accompanying drawings and detailed description.

DETAILED DESCRIPTION OF THE INVENTION

Figure 1:
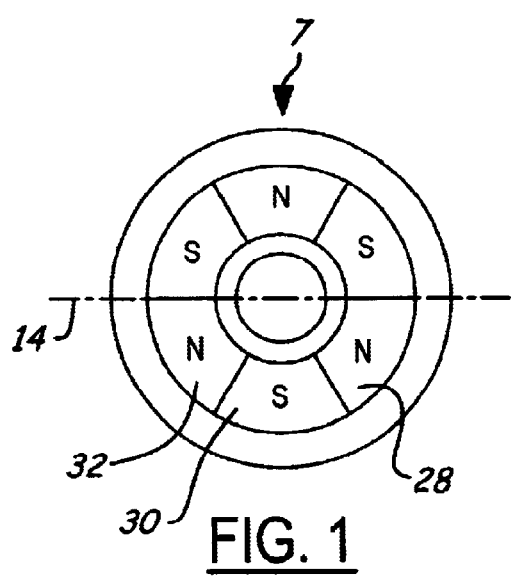
FIG. 1 is a front elevational view of a sensor ring according to the present invention.
Figure 2:
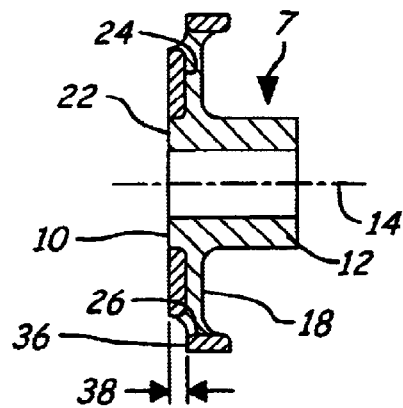
FIG. 2 is a sectional view of the sensor ring shown in FIG. 1.
Figure 3:
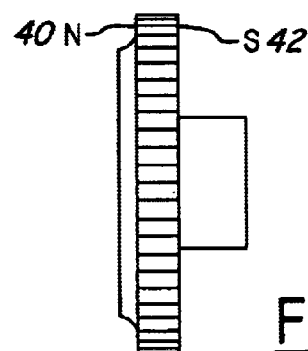
FIG. 3 is a top plan view of the sensor ring shown in FIGS. 1 and 2.

Referring now to FIGS. 1–4, a magnetic position sensor wheel 7 of the present invention has a body 10. The body 10 defines a hub portion 12. The body 10 may be fabricated from a polymeric material such as plastic. The body 10 can also be fabricated from a non-magnetic metal such as aluminum. The hub 12 is disposed about an axis 14 of rotation of a rotor 16 (shown in FIG. 4). The body 10 also has integrally joined with the hub a radially extending flange 18. The flange 18 has a front side face 22. An annular pocket 24 is formed in the face 22. Disposed between the rotational axis 14 and an outer peripheral edge 26 of the flange 18 is a first magnetic ring 28. The first ring 28 is formulated from a polymeric material having magnetic material mixed therein. The first ring 28 has magnetically alternating poles 30, 32 to provide six poles. The first ring 28 has a typical diameter of 30–40 mms. The amount of poles is equal in the example shown to the magnetic poles of the rotor 16.

The sensor wheel 7 also has a second ring 36 of magnetic material. The second ring 36 extends axially along the radially outer peripherial edge 26 of the flange 18. An axial forward edge of the second ring 36 is axially spaced from a forward edge of the first ring 22 by an axial dimension 38.

The second ring 36 has a greater resolution than the first ring 28. The second ring 36 has a series of 72 magnetically oppositely oriented poles 40, 42. In the example shown, the second ring 36 has a diameter approximately between 50–60 mms with each of the 72 poles representing a five degree arcuate segment.

Figure 4:
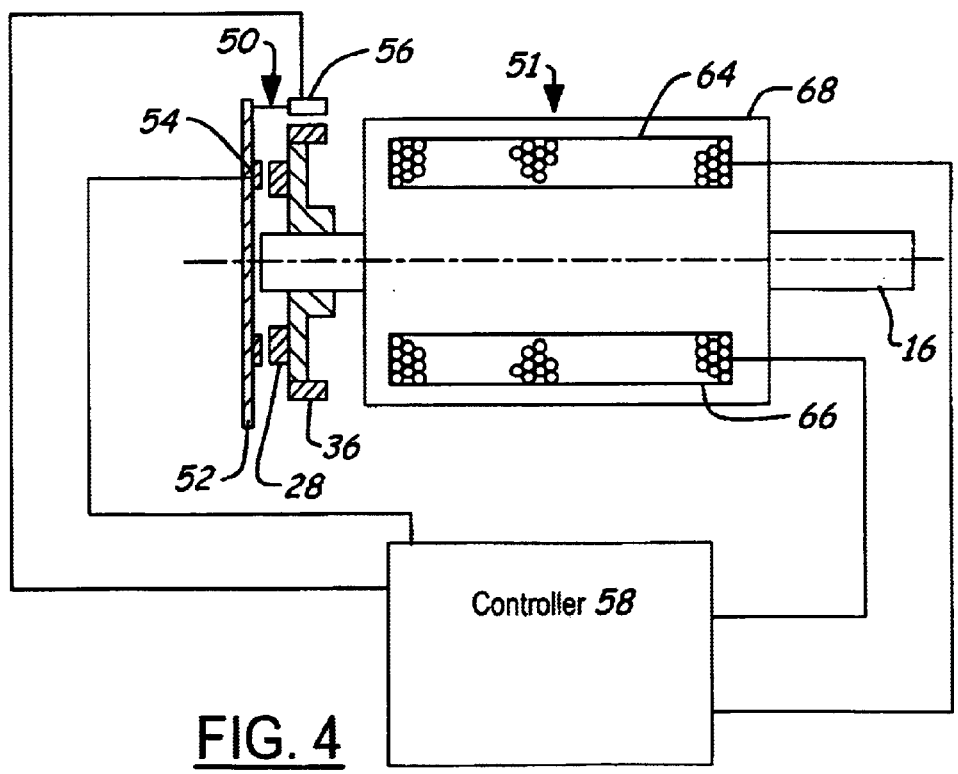
FIG. 4 is a schematic view of a motor with a transducer which utilizes the sensor ring of the present invention.

Referring additionally to FIG. 4, a transducer 50 of the present invention has a sensor holder 52. The sensor holder 52 supports a low resolution Hall effect sensor 54. The low resolution sensor 54 generates a first angular position indicative signal responsive to rotation of the first ring 28. The sensor holder 52 also supports a second high resolution sensor 56. The second high resolution sensor 56 generates a second position indicative signal responsive to rotation of the second ring 36.

The signals from the sensors 54, 56 are delivered to a controller 58. The controller 58 is inclusive of a driver circuit that controls the current delivered to stator coils 64, 66, which are positioned within a stator housing 68 that encircles the rotor 16. It should be noted that only two stator coils are shown. Typically there will be six or more stator coils which are, in like manner, driven by controller 58.

Typically the controller 58 will provide the stator coils 64, 66 with a sinusoidal current wave form in order to have a more constant torque output of the motor 51. The motor 51 in most instances will be an AC motor; however, it can be a DC brushless motor.

The present invention has been shown in various embodiments. However, it will be apparent to those skilled in the art of the various changes and modifications which can be made to the present invention without departing from the spirit or scope of the invention as it is encompassed by the following claims.

I claim:

1. A magnetic position sensor wheel for an angular position transducer of an electric motor comprising:
   a body defining a hub disposed about an axis of rotation and a flange extending radially from said hub;
   a first ring of magnetic material disposed on one side of said flange between said axis and a radially outer periphery of said flange; and
   a second ring of magnetic material extending axially along said radially outer periphery of said flange wherein said flange defines a first pocket and said first ring of magnetic material is disposed in said first pocket.

2. An apparatus as described in claim 1 wherein said body is fabricated-from a polymeric material.

3. An apparatus as described in claim 2 wherein said material is plastic.

4. An apparatus as described in claim 1 wherein said body is fabricated from a metal.

5. An apparatus as described in claim 4 wherein said metal is aluminum.

6. An apparatus as described in claim 1 wherein said second ring of magnetic material has a higher number of poles than said first ring of magnetic material.

7. An apparatus as described in claim 1 wherein said second ring of magnetic material is axially spaced from said first ring of magnetic material.

8. An angular position transducer, comprising:
   a magnetic position sensor wheel having:
      a body defining a hub disposed about an axis of rotation and a flange extending radially from said hub;
      a first ring of magnetic material disposed on one side of said flange between said axis and a radially outer periphery of said flange; and,
      a second ring of magnetic material extending axially along said radially outer periphery of said flange;
   a first sensor that generates a first position indicative signal responsive to rotation of said first ring of magnetic material; and,
   a second sensor that generates a second position indicative signal responsive to rotation of said second ring of magnetic material.

9. An apparatus as described in claim 8 wherein said body is fabricated from a polymeric material.

10. An apparatus as described in claim 9 wherein said material is plastic.

11. An apparatus as described in claim 8 wherein said body is fabricated from a metal.

12. An apparatus as described in claim 11 wherein said metal is aluminum.

13. An apparatus as described in claim 8 wherein said second sensor and said second ring of magnetic material have a higher power resolution than said first ring of magnetic material and said first sensor.

14. An apparatus as described in claim 8 wherein said flange has a generally flat face with a first pocket, said first ring of magnetic material disposed in said first pocket.

15. An apparatus as described in claim 8 wherein said second ring of magnetic material is axially spaced from said first ring of magnetic material.

16. A brushless motor comprising:
   a multi poled rotor;
   a coiled stator concentric with said rotor;
   a controller to commutate said stator coils; an angular position transducer to signal said controller of an angular position of said rotor, said transducer including:
      a magnetic position sensor wheel having:
         a body defining a hub disposed about an axis of rotation of said rotor and a flange extending radially from said hub;
         a first ring of magnetic material disposed on one side of said flange between said axis and a radially outer periphery of said flange; and,
         a second ring of magnetic material extending axially along said radially outer periphery of said flange;
      a first sensor that generates a first position indicative signal responsive to rotation of said first ring of magnetic material; and,
      a second sensor that generates a second position indicative signal responsive to rotation of said second ring of magnetic material.

17. An apparatus as described in claim 16 wherein said second sensor and said second ring of magnetic material have a higher power resolution than said first ring of magnetic material and said first sensor.

18. An apparatus as described in claim 16 wherein said flange has a generally flat face with a first pocket, said first ring of magnetic material disposed in said first pocket.

19. An apparatus as described in claim 16 wherein said second ring of magnetic material is axially spaced from said first ring of magnetic material.

20. An apparatus as described in claim 16 wherein said motor is an AC motor.

21. An apparatus as described in claim 16 wherein said motor is a DC motor.

* * * * *